US006130781A

United States Patent [19]

Gauvin

[11] Patent Number: 6,130,781

[45] Date of Patent: Oct. 10, 2000

[54] SKYLIGHT FOR DAY AND NIGHT ILLUMINATION

[76] Inventor: Aime H. Gauvin, 180 Eileen Ave., Altamonte Springs, Fla. 32714

[21] Appl. No.: 09/149,153

[22] Filed: Sep. 8, 1998

[51] Int. Cl.[7] .................... G02B 17/00

[52] U.S. Cl. .................... 359/591

[58] Field of Search .................... 359/591, 592, 359/593, 594, 595, 596, 597, 598

[56] References Cited

U.S. PATENT DOCUMENTS

| | | | |
|---|---|---|---|
| 4,329,021 | 5/1982 | Bennett et al. | 350/259 |
| 4,339,900 | 7/1982 | Freeman | 52/200 |
| 4,673,609 | 6/1987 | Hill | 428/187 |
| 5,099,622 | 3/1992 | Sutton | 52/200 |
| 5,115,601 | 5/1992 | Yamaguchi et al. | 52/1 |
| 5,191,748 | 3/1993 | Baughman | 52/28 |
| 5,467,564 | 11/1995 | DeKeyser et al. | 52/173.3 |
| 5,648,873 | 7/1997 | Jaster et al. | 359/591 |
| 5,655,339 | 8/1997 | DeBlock et al. | 52/200 |

OTHER PUBLICATIONS

UTD–2000 Brochure, 1996.

*Primary Examiner*—Safet Metjahic
*Assistant Examiner*—Christopher Mahoney
*Attorney, Agent, or Firm*—Allen, Dyer, Doppelt, Millbrath & Gilchrist, P.A.

[57] ABSTRACT

Phosphorescent materials are incorporated into the composition and construction of various components of a skylight. The resulting skylight absorbs light through these relevant components in the presence of external light while emitting phosphorescence, or delayed luminescence, in the absence of external light. The light-storage effects of the phosphorescent components offer the added advantage of reducing sensitivity of internal illumination intensity to abrupt variations in external light intensity. Using commercially-available high-performance phosphorescent materials, such skylight components are manufactured safely and cost-effectively. The resulting skylights offer simple passive interior illumination for hours after daylight ceases.

24 Claims, 3 Drawing Sheets

SKYLIGHT FOR DAY AND NIGHT ILLUMINATION

CROSS REFERENCE TO RELATED APPLICATIONS

| | | | |
|---|---|---|---|
| 3867302 | 2/1975 | Takano, et al. | 252/301.2R |
| 4022709 | 5/1977 | Ferro, et. al. | 252/301.35 |
| 4089995 | 5/1978 | Ferro, et. al. | 427/157 |
| 4329021 | 5/1982 | Bennett, et. al. | 350/259 |
| 4339900 | 7/1982 | Freeman | 52/22 |
| 5099622 | 3/1992 | Sutton | 52/200 |
| 5100580 | 3/1992 | Powell, et. al. | 252/301.35 |
| 5115601 | 5/1992 | Yamaguchi, et. al. | 52/1,200,62 |
| 5424006 | 6/1995 | Murayama, et. al. | 252/301.4R |
| 5467564 | 11/1995 | DeKeyser, et. al. | 52/173.3 |
| 5648873 | 7/1997 | Jaster, et. al. | 359/591 |
| 5655339 | 8/1997 | DeBlock, et. al. | 52/200 |
| 5770111 | 6/1998 | Moriyama, et. al. | 252/301.4R |

FIELD OF THE INVENTION

The invention relates to the field of building construction, and, more particularly, to a skylight for use in a building.

BACKGROUND OF THE INVENTION

Skylighting is a popular means of introducing natural present outside building structures into interior rooms which may otherwise be deprived of natural lighting due lack of wall windows or other reasons. A skylight in its simplest form consists of some roof dome which allows light to enter an attic enclosure which in turn leads to a ceiling dome. The structure provides a path for light to enter from the outside of the building to the illumination destination.

Various inventors have disclosed many improvements and developments on the basic concept of skylighting. These include, but are not limited to, Bennett et. al. in U.S. Pat. No. 4,329,021, issued May 11, 1982, which describes means of concentrating incident light by refraction and reflection; Freeman in U.S. Pat. No. 4,339,900, issued Jul. 20, 1982, which simplifies skylight construction by incorporating a flexible shaft attic enclosure; Sutton, in U.S. Pat. No. 5,099, 622, issued Mar. 31, 1992, which teaches intensification of skylight illumination intensity by virtue of a reflector strategically placed within the roof dome; Yamaguchi, et. al., in U.S. Pat. No. 5,115,601, issued May 26, 1992, which teaches a movable skylight; DeKeyser, et. al., in U.S. Pat. No. 5,467,564, issued Nov. 21, 1995 and Jaster, et. al, in U.S. Pat. No. 5,648,873, issued Jul. 15, 1997, which both teach capture and direction of daylight to a target illumination destination; also notably DeBlock et. al., in U.S. Pat. No. 5,655,339, issued Aug. 12, 1997, which teaches enhancement of illumination intensity by virtue of roof and ceiling dome structures incorporating reflective and refractive prisms, this in conjunction with a cylindrical cavity attic enclosure containing a highly reflective interior surface. These are but some of the many improvements and developments over the basic concept of passive skylighting. Although many developments and improvements have been introduced, skylighting remains until now limited by a single findamental operational restriction, being that of requiring proximate exterior daylight as a requirement for providing interior illumination.

BRIEF SUMMARY OF THE INVENTION

The present invention overcomes the fundamental operational limitation of skylights, that of requiring exterior daylight or other light in order to provide interior illumination. This limitation is overcome by the application of phosphorescent materials to the construction, composition or surface(s) of any of various skylight components. Such application of phosphorescent materials to the skylight's components enables the skylight, in the presence of exterior light, to absorb some light radiation, so "charging" its phosphorescent components, while passing other light radiation to the interior for illumination. In the absence of exterior light, the phosphorescent components emit phosphorescence, providing interior lighting in the absence of exterior lighting. The phosphorescent components exhibit the added functionality of limiting variations of interior illumination intensity due to variations in exterior lighting. This is due to the fact that in the presence of exterior light, interior illumination intensity is the sum of a direct exterior light component and an indirect phosphorescence illumination component. Exterior light is subject to rapid variation due to changing environmental conditions, such as cloud cover, while the latter is relatively uniform, taking extended periods of time to decay in phosphorescence intensity due to the extended light radiation release time characteristic of phosphorescent materials.

This disclosure describes several embodiments involving the use of various means of applying phosphorescence to various skylight components. In the preferred embodiment, phosphorescent material is applied to various interior skylight components in such a manner as to minimize illumination attenuation due to the presence of phosphorescent material, maximize exposure of phosphorescent material to incident light in the interest of effective "charging," and maximize illumination due to phosphorescence in the absence of exterior light.

DETAILED DESCRIPTION OF THE PREFERRED EMBODIMENTS OF THE INVENTION

Figure 1:
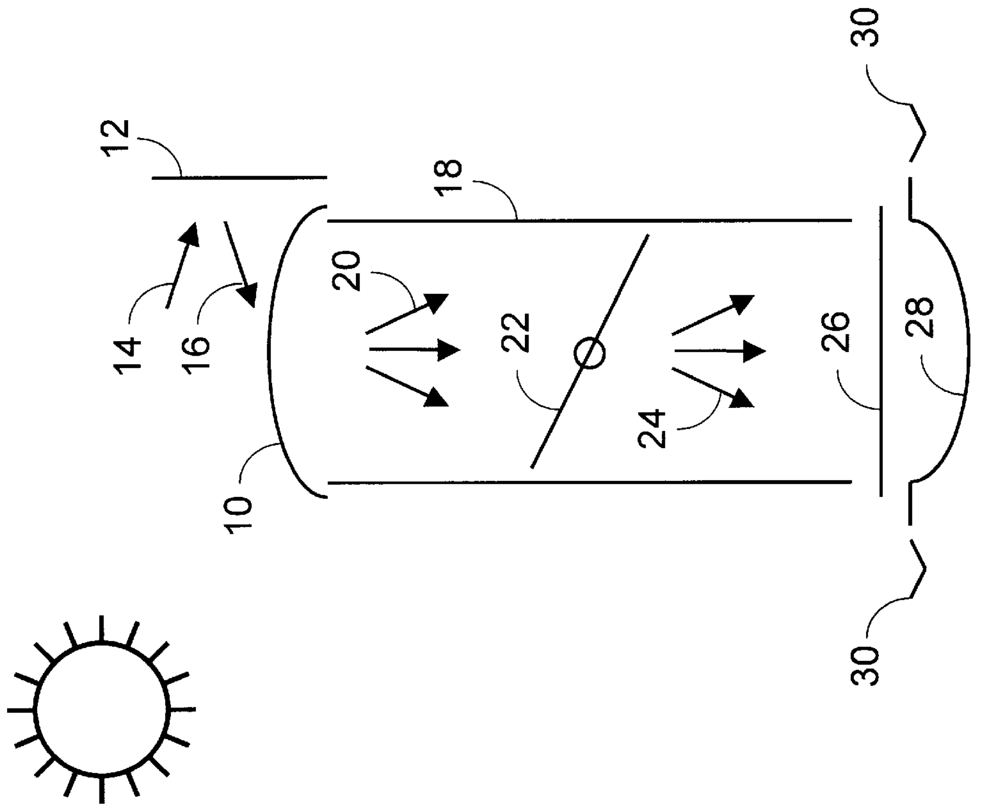
FIG. 1 is a simplified cross-section diagram showing the components of a conventional skylight as in the prior art.

The cross-section of a typical skylight as in the prior art is illustrated in FIG. 1. In a typical skylight, a roof dome 10 allows exterior light to enter 20 an attic enclosure 18. A mirror 12 or other reflecting or refracting apparatus may be used to reflect or refract any incident light 14 which would otherwise not enter the attic enclosure 18 back towards 16 and into the attic enclosure 18. This attic enclosure 18 may be walled, cylindrical, tubular, rigid, flexible, straight or curved. Its interior walls may be reflective or nonreflective. It is possible that the attic enclosure 18 may contain some sort of light damping apparatus 22 which would serve to vary the intensity of light from the point where it entered the enclosure 20 to the point where it exits the enclosure 24. At the bottom of the attic enclosure 18, a ceiling barrier 26 may be employed in the interest of sealing the attic enclosure 18 from the attic environment or from the interior environment. A ceiling dome 28 may be employed to diffuse light through the use of prisms, reflectors or frosting, or may be used simply for decorative reasons. Likewise some sort of ceiling fixture 30 may also be included for decorative reasons or otherwise.

Figure 2:
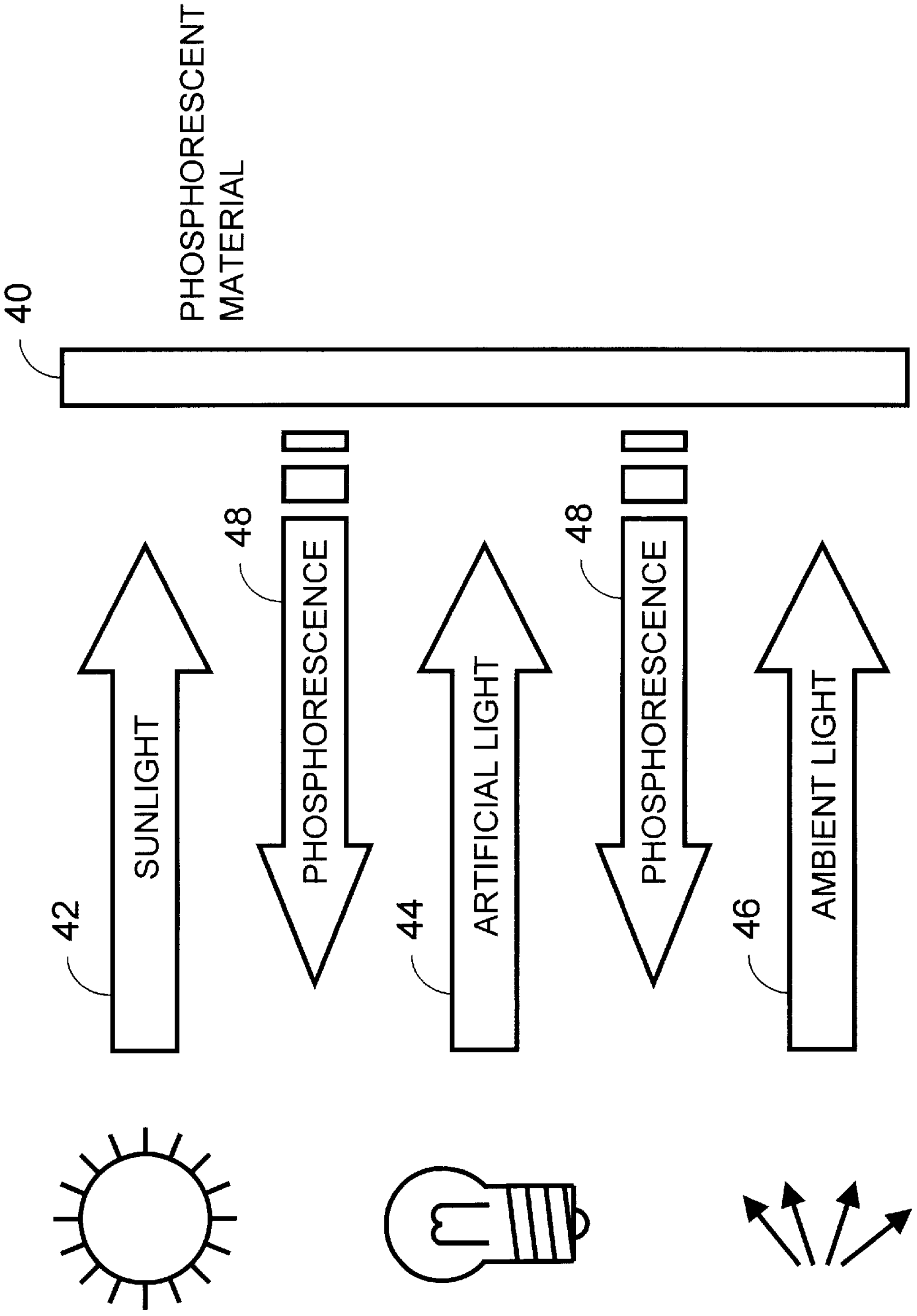
FIG. 2 is a drawing which illustrates the practical operation of phosphorescent material as in the prior art.

In this invention, the lighting capability of otherwise conventional skylighting is extended and enhanced through the introduction of phosphorescent materials, construction and/or coating. FIG. 2 illustrates the practical operation of phosphorescent materials. Incident light radiation such as sunlight 42, artificial light 44 or ambient light 46 which falls on some phosphorescent material 40 serves to "energize" or "charge" the phosphorescent material 40. This is to say that the incident light energy absorbed by the phosphorescent material 40 is stored by the same. This energy is released over time through phosphorescence 48, which is light emitted by the phosphorescent material over time to release stored energy. It is this phosphorescence which enables the skylight to illuminate in the absence of exterior light. It is the time delay associated with phosphorescence which enables interior lighting for significant amounts of time after incident exterior lighting has ceased.

Phosphorescent materials are available with sufficient performance to achieve significant levels of interior lighting in the absence of exterior lighting. For example, it is possible to keep a room illuminated for several hours after nightfall using a modest skylight with simple applications of phosphorescent material to a few components. Furthermore, effective phosphorescent materials are available in forms that are safe to work with and may be permanently applied. This information is available U.S. Pat. No. 5,770,111, issued to Moriyama et. al. on Jun. 23, 1998, detailing phosphorescent material exhibiting significant improvements in afterglow intensity and persistence.

In the first embodiment, phosphorescent material is applied to all or part of the skylight roof dome 10 as shown in FIG. 1. This embodiment is limited in its effectiveness for several reasons. Firstly, the phosphorescent material applied to the roof dome may have the undesired effect of blocking incident exterior light which would otherwise illuminate the interior. Secondly, in the absence of exterior light, the phosphorescence may lose intensity in the process of traveling from the top 20 of the attic enclosure 18 to the bottom 24. Worse yet, more than half of the phosphorescence is radiated up into the exterior, where it is not needed, rather than to the interior illumination destination.

In the second embodiment, phosphorescent material is applied to some reflector 12 or prism contained inside of, outside of or integrated as part of the roof dome 10. This embodiment shares the disadvantages of the first embodiment, the first being the impediment of exterior light which would otherwise be reflected, increasing interior illumination, and the second being the loss of phosphorescence intensity in the process of reaching the interior 24 from the top 20 of the attic enclosure 18. Worse still, more phosphorescence is lost to the exterior than that channeled to the interior.

In the third embodiment, phosphorescent material is applied to one or more of the walls or surfaces of the attic enclosure 18. While this embodiment brings the source of phosphorescent light closer to the illumination destination, it still brings considerable potential disadvantage. For example, in the case of a mirrored interior attic enclosure 18 surface, a phosphorescent coating would attenuate incident light otherwise usable for increasing daytime illumination. In addition, half of the phosphorescence is lost to the exterior through the roof dome 10, never illuminating the interior through the ceiling dome 28.

In the fourth embodiment, phosphorescent material is applied to a movable light damping apparatus 22. This has the advantage of allowing the phosphorescent material to charge while in the open position, and allowing one side of the damper 22, in the closed position, to emit phosphorescence bound only for the interior. The primary disadvantage of this embodiment is that of complicating the construction and operation of the skylight.

In the fifth embodiment, phosphorescent material is applied to the composition, construction or surface(s) of all or parts of the ceiling barrier 26. The primary advantage is its relative proximity to the illumination destination in the interior. The primary disadvantages again are loss of daytime illumination due to absorption by phosphorescent material and loss of half of the phosphorescence to the exterior up through the attic enclosure 18.

In the sixth embodiment, phosphorescent material is applied to the composition, construction or surface(s) of all or parts of the ceiling dome 28. This embodiment offers the advantage of providing the most proximate phosphorescence for illumination in the absence of external light. It also offers the greatest degree of insensitivity of daytime light intensity to changes in external light intensity. However, this embodiment still attenuates daytime illumination due to absorption of incident light by the phosphorescent material. This embodiment also continues to lose some of the phosphorescence to the exterior up through the attic enclosure 18.

Figure 3:
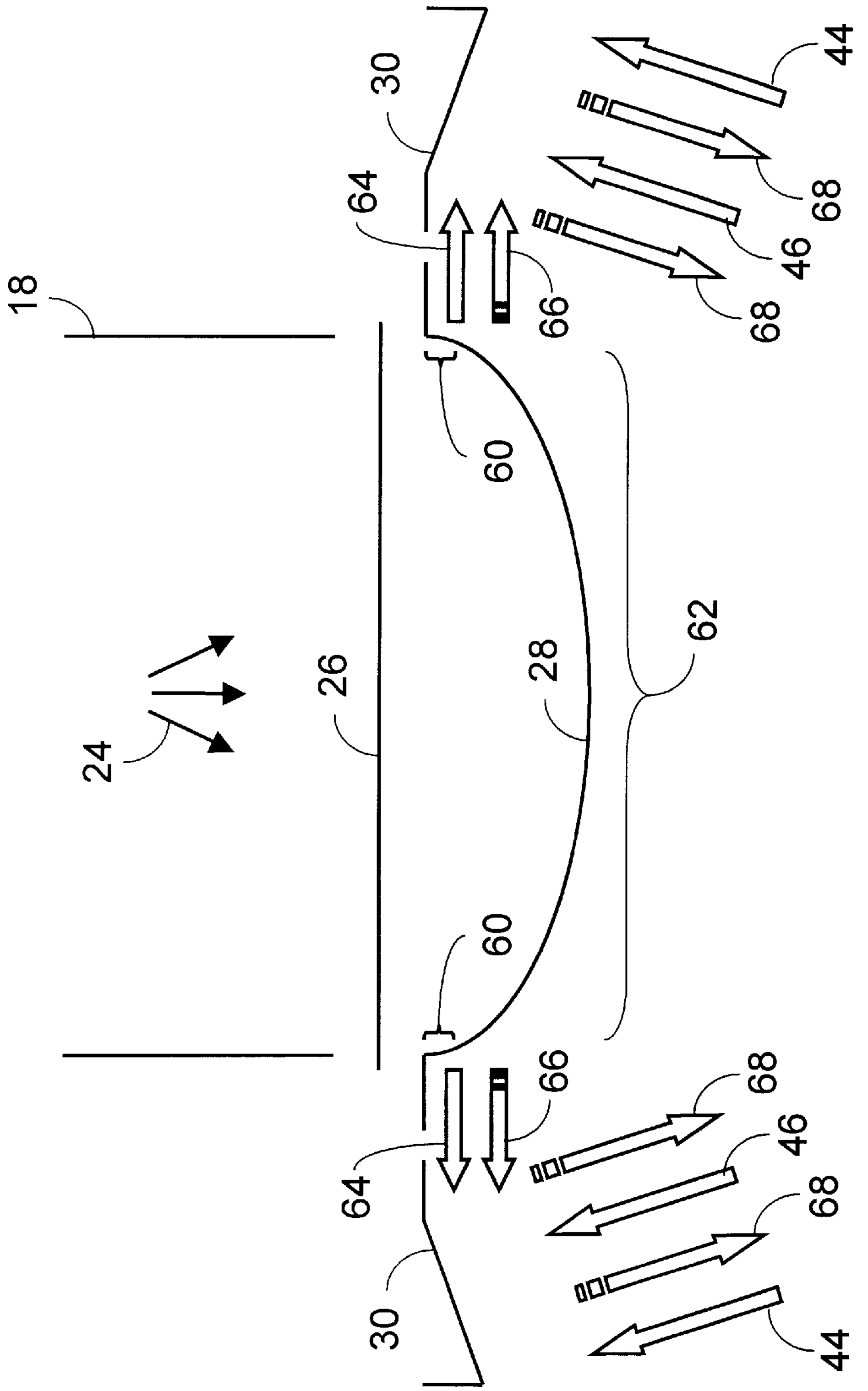
FIG. 3 is a simplified cross-section diagram of an angled phosphorescent ceiling fixture in accordance with the present invention.

In the seventh embodiment, phosphorescent material is applied to a ceiling fixture 30. The best implementation of this embodiment is the use of an angled ceiling fixture 30 as shown in FIG. 3. Such an angled ceiling fixture is positioned to allow the phosphorescent material incorporated into the angled rim of the ceiling fixture 30 to absorb low-angle incident light 64 passing through the top edge 60 of the ceiling dome 28. Such light would be incident at too low an angle for illumination of the interior below, offering the advantage that light that would otherwise have been lost to the illumination destination is applied to the "charging" of the phosphorescent material. The angled rim of the ceiling fixture 30 is in a position to emit phosphorescence 68 which will most directly reach the interior illumination destination while little phosphorescence is lost back up the attic enclosure 18. This embodiment has the additional advantage that the angled rim of the ceiling fixture 30 can absorb additional artificial light 44 and ambient light 46 from the interior in order to store more energy for later release, and to maintain its energy for longer continued illumination.

The preferred embodiment consists of a combination of the sixth and seventh embodiments. In the preferred embodiment, phosphorescent material is incorporated primarily into the construction, composition or surface of the angled rim of the ceiling fixture 30 with all the advantages listed above. In addition, a small amount of phosphorescent material is applied to the inner surface of the bowl 62 of the ceiling dome 62. The amount of phosphorescent material applied to the bowl 62 of the ceiling dome 62 would correspond to the degree of incident light diffusion designed into an otherwise "frosted" ceiling dome 28 intended otherwise for use only as a light diffuser. The light attenuation realized by the phosphorescent material applied to the surface of the bowl 62 of the ceiling dome is equivalent to the light attenuation which a frosted dome would apply in the process of diffusing light. The first advantage to coating the bowl 62 of the ceiling dome 28 as such is that light otherwise lost in the diffusion process is applied to charging the phosphorescence of the bowl 62 of the ceiling dome 28. The second advantage is that the phosphorescence causes interior illumination levels to be less sensitive to abrupt changes in exterior illumination, this due to the light storage effect of the phosphorescent material coating the bowl 62 of the ceiling dome 28.

In the preferred embodiment, phosphorescent material is not applied to the rim 60 of the ceiling dome 28. The advantage of this detail is that light incident on the ceiling dome 28 through its top edge 60 at a low angle, bound for the angled rim of the ceiling fixture 30, passes through the top edge 60 of the ceiling dome 28 without attenuating, allowing maximum absorption of light by the phosphorescent material incorporated into the angled rim of the ceiling fixture 30, intensifying delayed phosphorescence. The phosphorescent angled rim of the ceiling fixture 30 is charged not only by incident light 64 passing through the top edge 60 of the ceiling dome 28, but also by the phosphorescence 66 emitted by the bowl 62 of the ceiling dome 28. Finally, the advantage of applying phosphorescent material to the inside surface of the bowl 62 of the ceiling dome 28, as opposed to the outside surface, is the smoother appearance of the ceiling dome 28 when seen from the interior.

What is claimed is:

1. A skylight apparatus comprising:

a roof opening cover for admitting external light therethrough and covering a roof opening in a building; and an enclosure for admitting external light passing through said roof opening cover into the building, said enclosure comprising wall portions defining an upper enclosure end terminating at said roof opening cover, and a lower enclosure end terminating within the building;

at least one of said roof opening cover and said enclosure comprising a phosphorescent material for being charged from external light and for radiating light after charging.

2. A skylight apparatus according to claim 1 further comprising a ceiling dome adjacent the lower enclosure end.

3. A skylight apparatus according to claim 2 wherein said ceiling dome comprises a phosphorescent material.

4. A skylight apparatus according to claim 1 further comprising a ceiling fixture surrounding the lower enclosure end.

5. A skylight apparatus according to claim 4 wherein said ceiling fixture comprises a phosphorescent material.

6. A skylight apparatus according to claim 1 further comprising a movable light damper within said enclosure.

7. A skylight apparatus according to claim 6 wherein said movable light damper comprises a phosphorescent material.

8. A skylight apparatus according to claim 1 further comprising a ceiling barrier adjacent the lower enclosure end.

9. A skylight apparatus according to claim 8 wherein said ceiling barrier comprises a phosphorescent material.

10. A skylight apparatus comprising:

a roof opening cover for admitting external light therethrough and to cover a roof opening in a building;

an enclosure for admitting external light passing through said roof opening cover into the building, said enclosure comprising wall portions defining an upper enclosure end terminating at the roof opening cover, and a lower enclosure end terminating at a ceiling opening within the building; and a ceiling opening cover at the lower enclosure end and covering the ceiling opening; and a ceiling fixture surrounding said ceiling opening cover and comprising a phosphorescent material for being charged from external light and for radiating light after charging.

11. A skylight apparatus according to claim 10 further comprising a movable light damper within said enclosure.

12. A skylight apparatus according to claim 10 further comprising a ceiling barrier adjacent the lower enclosure end.

13. A skylight apparatus comprising:

a roof opening cover for admitting external light therethrough and to cover a roof opening in a building;

an enclosure for admitting external light passing through said roof opening cover into the building, said enclosure comprising wall portions defining an upper enclosure end terminating at said roof opening cover, and a lower enclosure end terminating within the building; and a body adjacent a lower end of said enclosure and comprising a ring of phosphorescent material for being charged from external light and for radiating light after charging.

14. A skylight apparatus according to claim 13 wherein said body comprises a ceiling fixture surrounding the lower enclosure end.

15. A skylight apparatus according to claim 13 wherein said body comprises a ceiling dome.

16. A skylight apparatus according to claim 13 wherein said body comprises a ceiling barrier.

17. A skylight apparatus according to claim 13 further comprising a movable light damper within said enclosure.

18. A skylight apparatus according to claim 17 wherein said movable light damper comprises a phosphorescent material.

19. A method for making a skylight comprising the steps of:

providing a roof opening cover for admitting external light therethrough and to cover a roof opening in a building;

providing an enclosure for admitting external light passing through the roof opening cover into the building, the enclosure comprising wall portions defining an upper enclosure end terminating at the roof opening cover, and a lower enclosure end terminating within the building; and providing a body adjacent a lower end of the enclosure and comprising a ring of phosphorescent material for being charged from external light and for radiating light after charging.

20. A method according to claim 19 wherein the step of providing the body comprises providing a ceiling fixture surrounding the lower enclosure end.

21. A method according to claim 19 wherein the step of providing the body comprises providing a ceiling dome.

22. A method according to claim 19 wherein the step of providing the body comprises providing a ceiling barrier.

23. A method according to claim 19 further comprising the step of providing a movable light damper within the enclosure.

24. A method according to claim 23 wherein the step of providing a movable light damper comprises providing a movable light damper comprising a phosphorescent material.

* * * * *